US012661626B2

(12) United States Patent
Cummings et al.

(10) Patent No.: US 12,661,626 B2
(45) Date of Patent: Jun. 23, 2026

(54) MICROSPHERE SYNTHESIS VIA ULTRASONIC SPRAY PYROLYSIS

(71) Applicant: Honeywell Federal Manufacturing & Technologies, LLC, Kansas City, MO (US)

(72) Inventors: Laura Christine Cummings, Kansas City, MO (US); Eric Benjamin Cole, Lee's Summit, MO (US); Connor Daniel Pearson, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 709 days.

(21) Appl. No.: 17/987,654

(22) Filed: Nov. 15, 2022

(65) Prior Publication Data

US 2023/0149877 A1     May 18, 2023

Related U.S. Application Data

(60) Provisional application No. 63/279,483, filed on Nov. 15, 2021.

(51) Int. Cl.
B01J 13/04          (2006.01)
B05B 17/06          (2006.01)
(52) U.S. Cl.
CPC .............. B01J 13/04 (2013.01); B05B 17/06 (2013.01)

(58) Field of Classification Search
None
See application file for complete search history.

(56) References Cited

U.S. PATENT DOCUMENTS

| | | | |
|---|---|---|---|
| 6,025,034 A | 2/2000 | Strutt et al. | |
| 6,193,936 B1 | 2/2001 | Gardner et al. | |
| 7,537,803 B2 | 5/2009 | Wang et al. | |
| 9,914,106 B2 | 3/2018 | Suslick et al. | |
| 2005/0121814 A1* | 6/2005 | Morrison ............. | A61K 9/5089 264/4.1 |
| 2005/0191491 A1* | 9/2005 | Wang ................... | A61K 9/5153 428/407 |
| 2007/0003694 A1* | 1/2007 | Chiruvolu ................ | B01J 2/003 427/532 |

OTHER PUBLICATIONS

Spray Drying for the Encapsulation of Oils, Nameer Khairullah Mohammed, Chin Ping Tan , Yazid Abd Manap , Belal J. Muhialdin, and Anis Shobirin Meor Hussin, MDPI, Molecules 2020, 16 pages.

* cited by examiner

*Primary Examiner* — Jeffrey D Washville
(74) *Attorney, Agent, or Firm* — Hovey Williams LLP

(57) ABSTRACT

An apparatus, methods, and systems for forming microspheres comprises a furnace and an ultrasonic nozzle. The furnace has a channel and is operable to generate heat in the channel. The ultrasonic nozzle is configured to receive precursor solution and spray precursor droplets into the channel so that the heat in the channel causes the precursor droplets to form the microspheres.

21 Claims, 6 Drawing Sheets

101 Pump precursor solution to an ultrasonic nozzle

102 Spray precursor solution via the ultrasonic nozzle

103 Heat droplets via a furnace to form microspheres

104 Collect microspheres via collection vessel

100

18

22

24

28

30

26

MICROSPHERE SYNTHESIS VIA ULTRASONIC SPRAY PYROLYSIS

CROSS-REFERENCE TO RELATED APPLICATIONS

The present application claims the priority benefit of U.S. Provisional Patent Application Ser. No. 63/279,483, filed Nov. 15, 2021, entitled MICROSPHERE SYNTHESIS VIA ULTRASONIC SPRAY PYROLYSIS, incorporated by reference in its entirety herein.

STATEMENT REGARDING FEDERALLY-SPONSORED RESEARCH OR DEVELOPMENT

This invention was made with Government support under Contract No.: DE-NA-0002839 awarded by the United States Department of Energy National Nuclear Security Administration. The Government has certain rights in the invention.

BACKGROUND

Microspheres are used for sensors, actuators, and as additives for polymers. Current methods for forming microspheres use piezoelectric transducers to form droplets of precursor solution. Such methods generally produce microspheres of about 2 to 30 microns using precursor solution having polymer concentrations of about 0.1 to 100 mg/ml. However, piezoelectric transducers fail to sufficiently form droplets when the concentration of the solution is increased. Further, the piezoelectric transducers are only able to produce limited sizes of microspheres (up to 30 microns) and are sensitive to viscosity changes.

The background discussion is intended to provide information related to the present invention which is not necessarily prior art.

SUMMARY OF THE INVENTION

The present invention solves the above-described problems and other problems by providing an apparatus, system, and method of forming microspheres with a wider range of diameters and at a higher throughput.

An apparatus constructed according to an embodiment of the present invention is operable to form microspheres. The apparatus comprises a furnace and an ultrasonic nozzle. The furnace has a channel and is operable to generate heat in the channel.

The ultrasonic nozzle is configured to receive precursor solution and spray precursor droplets into the channel so that the heat in the channel causes the precursor droplets to form the microspheres. By using an ultrasonic nozzle, precursor solutions with higher concentrations can be used to increase throughput and form larger microspheres. Additionally, the microspheres may be continuously produced, which further increases throughput as compared to existing batch processes.

A method of forming microspheres according to an embodiment of the present invention broadly comprises pumping a precursor solution through an ultrasonic nozzle thereby forming a spray comprising droplets of the precursor solution, introducing the droplets of the precursor solution downwardly into a furnace, and heating the droplets of the precursor solution in the furnace to form the microspheres.

A system for forming microspheres constructed according to an embodiment of the present invention broadly comprises a precursor vessel, a syringe pump, an ultrasonic nozzle, a tube furnace, and a collection vessel. The precursor vessel stores precursor solution, and the syringe pump is in fluid communication with the vessel. The syringe pump is configured to pump the precursor solution to the ultrasonic nozzle.

The ultrasonic nozzle is configured to receive the precursor solution from the syringe pump and spray precursor droplets. The tube furnace is positioned below the ultrasonic nozzle and comprises a vertically-oriented channel and a heating element. The channel has a top opening for receiving the precursor droplets from the ultrasonic nozzle and a bottom opening opposite to the top opening. The heating element is operable to generate heat in the channel. The collection vessel is positioned below the bottom opening of the channel of the tube furnace and receives the microspheres formed from the droplets heated in the channel. By using an ultrasonic nozzle, precursor solutions with higher concentrations can be used to increase throughput and form larger microspheres.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
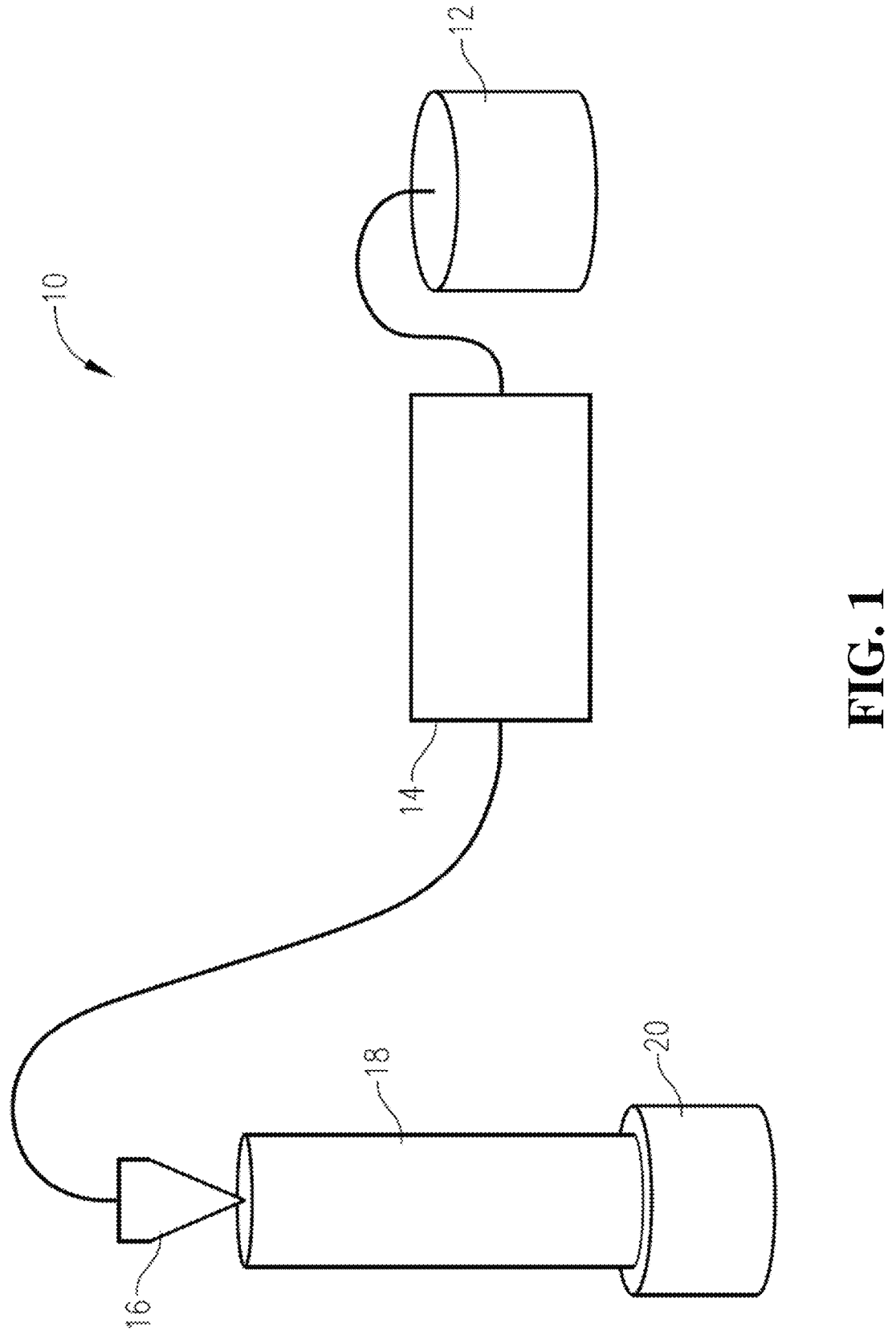
FIG. 1 is a schematic diagram of a system for forming microspheres constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a system 10 constructed in accordance with an embodiment of the invention is illustrated. The illustrated system 10 is configured to form microspheres (depicted in FIG. 3) from a precursor solution and comprises a precursor vessel 12, a pump 14, an ultrasonic nozzle 16, a furnace 18, and a collection vessel 20.

The precursor vessel 12 is operable to store precursor solution and is in fluid communication with the pump 14. The precursor solution may comprise a solvent and microsphere material. The microsphere material generally comprises one or more precursor materials, at least one of which may preferably be cured upon heating to form the microspheres. In certain embodiments, the precursor solution comprises microsphere material that is soluble in the solvent (i.e., the microsphere material dissolves in the solvent rather than being suspended or dispersed in the solvent) at the laboratory room temperature at pressure (e.g., 20° C. at 1 atm).

In certain embodiments, the solvent comprises an organic solvent. In certain embodiments, the solvent comprises a hydrocarbon solvent. In certain embodiments, the hydrocarbon solvent is selected from the group consisting of toluene, xylene, ligroin, mineral spirits, and chlorinated hydrocarbons. Other solvents may also be used that preferably dissolve the precursor materials. However, in certain embodiments, the solvent does not comprise water or alcohols such as methanol and ethanol.

In certain embodiments, the one or more precursor materials comprise at least one curable polymer. Exemplary curable polymers include polysiloxanes (silicones) and epoxies, although other curable polymers may be used, particularly heat curable polymers. In certain embodiments, the one or more precursor materials may comprise an additional polymer (other than the curable polymer), which may form core-and-shell droplets and microspheres (upon heating). Particularly preferred additional polymers include those than can be washed or baked out of the microspheres after incorporation into a matrix (i.e. DIW printing). In certain embodiments, the microsphere material comprises a silicone material and an additional polymer. For example, the additional polymer may comprise polyethylene glycol (PEG), and the silicone material may comprise a silicone elastomer, such as polydimethylsiloxane. In certain embodiments, the PEG comprises an average molecular weight of about 400 to about 6000, preferably about 800 to about 1200.

In certain embodiments, the one or more precursor materials further comprise a catalyst material, which may be used accelerate curing of the curable polymer component upon heating. The catalyst material may be provided in a combined, single formulation with the polymer component, or the catalyst material may be added to the solvent separately from the curable polymer precursor material.

In certain embodiments, the precursor solution comprises about 20 mg/mL to about 500 mg/mL, preferably about 100 mg/mL to about 300 mg/mL of the curable polymer. In certain embodiments, the precursor solution comprises about 10 mg/mL to about 250 mg/mL, preferably about 50 mg/mL to about 150 mg/mL of the catalyst material. In certain embodiments, the ratio of curable polymer to catalyst material is about 2:1. In certain embodiments, the precursor solution comprises about 5 mg/mL to about 150 mg/mL, preferably about 30 mg/mL to about 90 mg/mL of the additional polymer (e.g., PEG). In certain embodiments, the ratio of curable polymer to the additional polymer is about 3:1 to about 4:1. In certain embodiments, the concentration of the total microsphere material (i.e., curable polymers, additional polymers, and catalyst) within the solvent may be greater than 100 mg/ml, greater than about 150 mg/mL, greater than about 200 mg/mL, greater than about 250 mg/mL, greater than about 300 mg/mL, and in some embodiments, the concentration may be at least 350 mg/ml, depending on the desired throughput and size of the microspheres to be formed. Generally, higher throughput is achieved via higher concentrations of material. In some embodiments, the concentration of the total microsphere material may be at least about 150 mg/ml, or about 150 mg/ml to about 300 mg/ml.

Turning back to FIG. 1, the pump 14 is configured to pump the precursor solution from the precursor vessel 12 to the ultrasonic nozzle 16. In some embodiments, the pump 14 comprises a syringe pump, a high performance liquid chromatography (HPLC) style pump, a positive displacement pump, a peristaltic pump, or the like. However, the system 10 may include a different type of pump without departing from the scope of the present invention.

The ultrasonic nozzle 16 receives precursor solution and is pumped through nozzle 16, thereby spraying precursor solution droplets into the furnace 18. The ultrasonic nozzle 16 may be configured to operate at a range of frequencies to adjust the droplet sizes and therefore the microsphere sizes. The ultrasonic nozzle 16 may be oriented so that it sprays the droplets downward into the furnace 18. For example, the ultrasonic nozzle 16 may receive the precursor solution at an inlet on its top end and spray the droplets out of an outlet at its bottom end. Thus, in some embodiments, the droplets from the ultrasonic nozzle 16 may be directed into the furnace 18 without the use of a carrier gas. However, in certain embodiments, the droplets may be directed into the furnace 18 with a carrier gas.

The carrier gas may be any of a variety of gaseous substances that are capable of combining with the droplets in conduit 220 and direct the droplets downwardly though bottom opening 224 into the furnace 218. In certain preferred embodiments, the carrier gas is an inert gas (i.e., does not react with the precursor materials in the furnace). In certain embodiments, the carrier gas is selected from the group consisting of nitrogen, helium, neon, krypton, argon, xenon, radon, and mixtures thereof. In certain embodiments, the carrier gas is substantially free of air or oxygen, as the oxygen may undesirably react with the siloxanes in the curable polymer in the droplets.

In certain embodiments, ultrasonic nozzle 16 may be a spray shaping nozzle configured to concurrently introduce a carrier gas along with the droplets into the channel. The spray shaping nozzle may include both a spray delivering outlet and one or more carrier gas delivering outlets, where the carrier gas is delivered so as to entrain the spray and direct the spray downwardly toward the furnace 18. For example, the spray shaping nozzle may comprise a central spray outlet and an annular gas outlet at least partially encircling the spray outlet. An exemplary spray shaping nozzle include the AccuMist™ Ultrasonic Spray Shaping nozzle manufactured by Sono-Tek.

Figure 5:
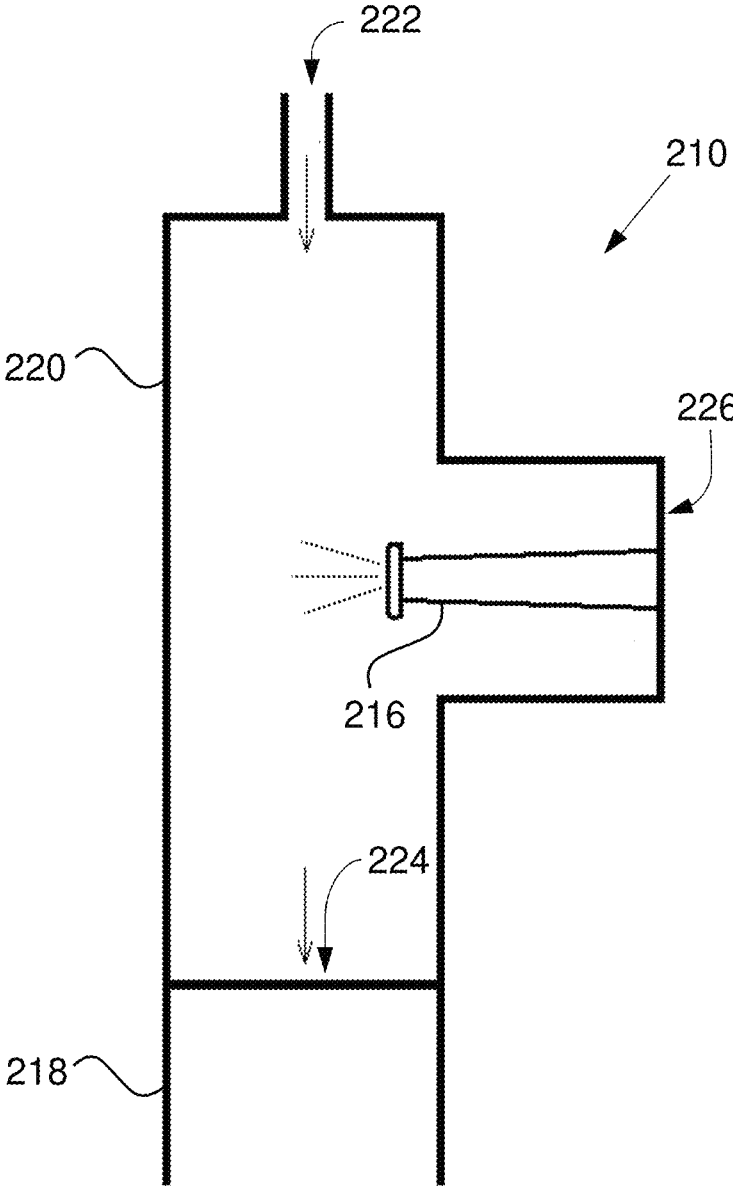
FIG. 5 is a schematic diagram of a system for forming microspheres constructed in accordance with embodiments of the present invention.

An alternate configuration for introducing droplets into the furnace is depicted in FIG. 5. As depicted, system 210 comprises a conduit 220 positioned above furnace 218. In certain embodiments, conduit 220 has a generally t-shaped configuration and comprises a top opening 222, a bottom opening 224, and a side opening 226. An ultrasonic nozzle 216 may be horizontally installed through side opening 226. Top opening 222 is positioned above the side opening 226 and is configured to introduce a carrier gas downwardly into the conduit 220. The carrier gas may be introduced via a carrier gas line (not shown) that may be secured to top opening 222 to deliver the carrier gas into top opening 222.

Similar to the embodiment of FIG. 1, the ultrasonic nozzle 216 receives precursor solution, which is pumped through nozzle 216, thereby spraying precursor solution droplets into the conduit 220. As shown in FIG. 5, the ultrasonic nozzle 216 may be oriented so that it sprays the droplets horizontally into the conduit 220. When the droplets are introduced into conduit 220, they will become entrained in the carrier gas flowing downwardly through the conduit 220 toward the bottom opening 224 and furnace 218. The bottom opening 224 is attached to the top of furnace 218 and is configured to direct the droplets and the carrier gas into the channel (not shown in FIG. 5) of the furnace 218. In certain embodiments, bottom opening 224 of conduit 220 may be secured directly to the top of furnace 218. However, in certain embodiments, an adapter may be used to attach the bottom opening 224 of conduit 220 to the top of furnace 218.

The ultrasonic nozzle 16 may be configured to produce droplets having a wide range of diameters, such as about 10 to about 100 microns. In some embodiments, the ultrasonic nozzle 16 is configured to produce droplets having average diameters (i.e., D50, or median particle diameter, as measured across the longest lateral distance) of about 20 to about 80 microns or about 30 to about 50 microns. The ultrasonic nozzle 16 enables a much higher throughput and therefore continuous flow or production of microspheres.

Figures 2, 4:
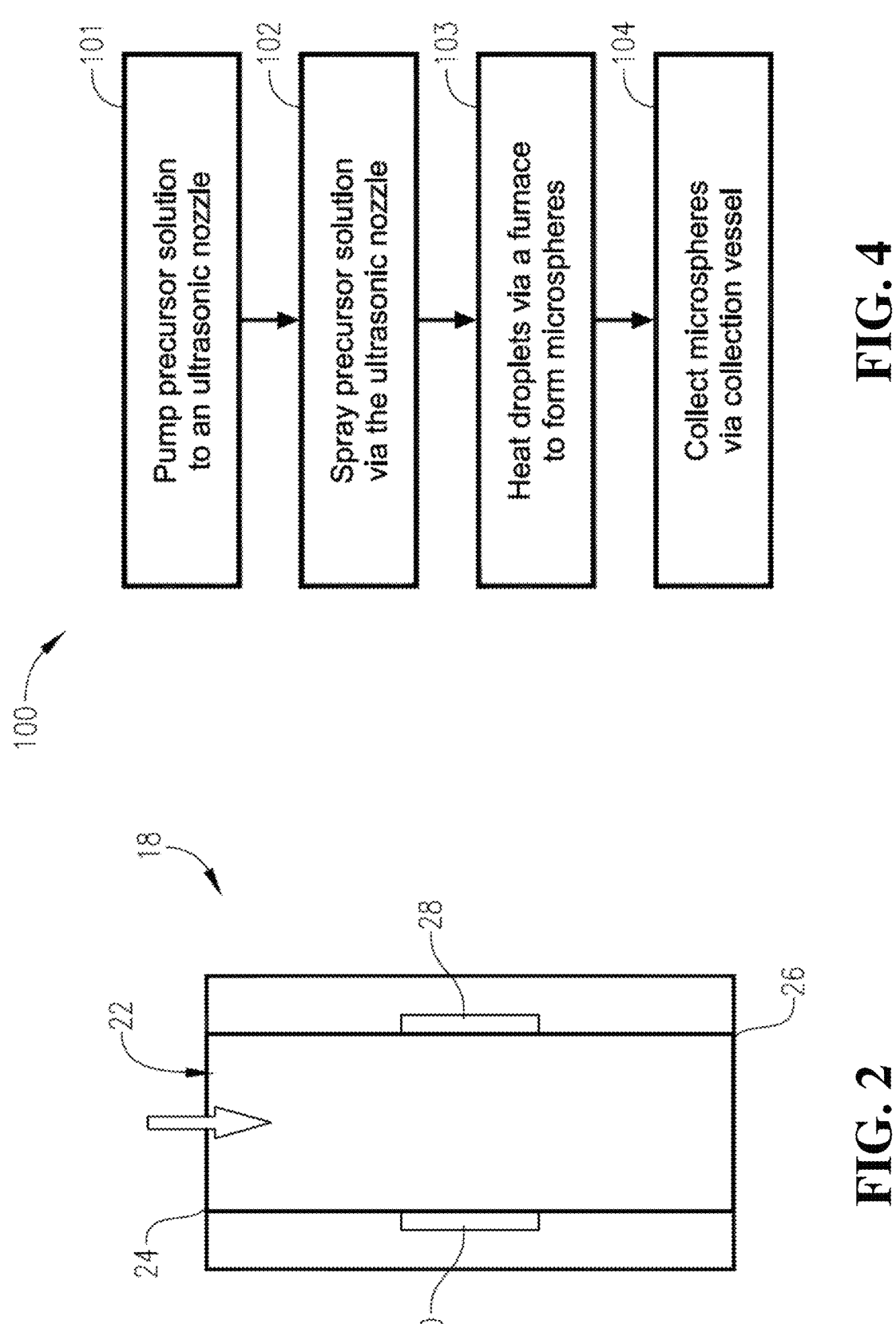
FIG. 2 is a schematic diagram of portions of a furnace of the system of FIG. 1.
FIG. 4 is a flowchart depicting exemplary steps of a method according to an embodiment of the present invention.

The furnace 18 is configured to receive the droplets from the ultrasonic nozzle 16 and heat them. Turning to FIG. 2, the furnace 18 may be an electrical tube furnace with a vertical channel 22 and one or more heating elements 28, 30. In certain embodiments, the furnace comprises a metal material, which may be more resilient to withstand temperature changes than glass materials. The channel 22 may include a top opening 24 for receiving droplets from the ultrasonic nozzle 16 (depicted in FIG. 1) and a bottom opening 26 where solidified microspheres exit the channel 22 and enter the collection vessel 20 (depicted in FIG. 1). The heating elements 28, 30 may be electrical heating elements, such as electrically resistive heaters. In some embodiments, the heating elements 28, 30 may comprise silicon carbide heating elements. As the droplets flow down into the channel 22, as indicated by the arrow, the heating elements 28, 30 heat the droplets to form solidified microspheres. In particular, heating the droplets can act to both evaporate the solvent and/or cure the curable polymer components in the droplets, thereby resulting in the solidified microspheres. The heating is performed in the absence of oxygen and thus the polymer curing can be generally referred to as a pyrolysis reaction. In certain embodiments, the heating is performed without the use of laser pyrolysis (i.e., without using a laser as the source of energy for the heating step).

The microspheres may comprise a core and a shell, and/or the microspheres may be solid microspheres. The microspheres may have a D50 of up to about 100 microns (micrometers). In some embodiments, the microspheres have a D50 of about 20 to about 80 microns or about 30 to about 50 microns. In certain embodiments, the resulting microspheres may be formed of a shell comprising cured silicone, and the core may comprise an additional polymer, such as polyethylene glycol (PEG).

Figure 3:
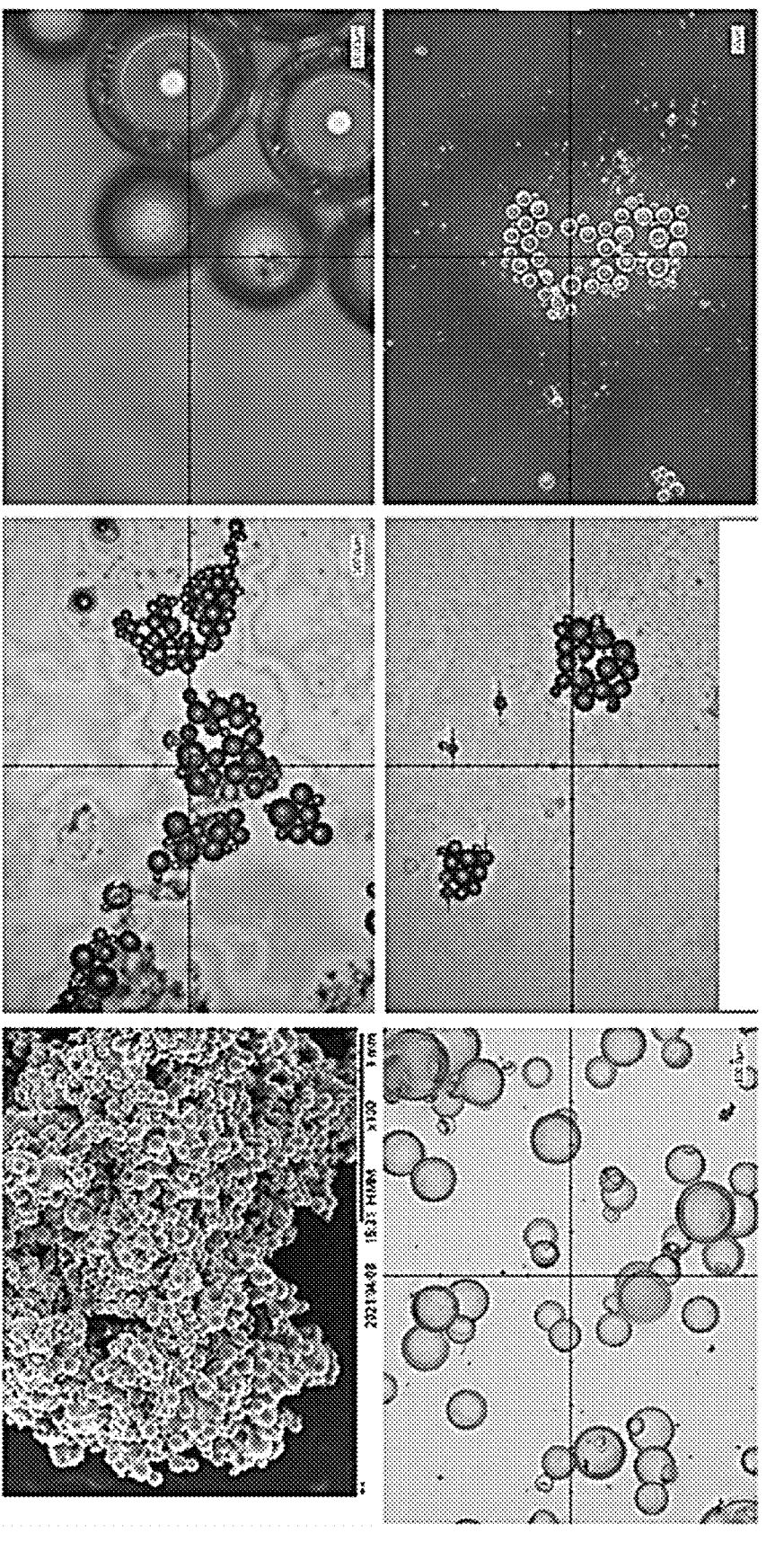
FIG. 3 depicts images of the microspheres formed by the system of FIG. 1.

Turning briefly back to FIG. 1, the collection vessel 20 is operable to collect the solidified microspheres. The collection vessel 20 may be positioned below the furnace 18 and include a solvent or substrate that does not dissolve the microspheres. For example, in certain embodiments, the solvent used to collect the microspheres comprises hexane. The microspheres in the solvent may be separated via a centrifuge. Turning to FIG. 3, microspheres formed via embodiments of the present invention are depicted.

The microspheres formed by the system 10 may be used as pore-forming fillers, used in direct-ink write resins, and/or in molded parts. The precursor solution may comprise fluorescent material, such as fluorescent dyes and/or fluorescent markers, so that the system 10 forms fluorescent microspheres for diagnostic applications. The precursor solution may include magnetic material, such as neodymium and/or iron filings, so that the system 10 forms magnetic microspheres. Further, the precursor solution may include conductive material, such as metals, so that the system 10 forms conductive core materials with an oxidation-resistant shell. The precursor solution may include bio-compatible material, such as active pharmaceutical ingredient (API) and/or therapeutics, so that the system 10 forms bio-compatible core-shell microspheres for drug delivery applications.

The flow chart of FIG. 4 depicts the steps of an exemplary method 100 of forming microspheres. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-3.

Referring to step 101, a precursor solution is pumped to an ultrasonic nozzle. The precursor solution may be pumped via a pump, such as a syringe pump. The precursor solution may be stored in a precursor vessel and may comprise a solvent and one or more materials for forming the microspheres, as described above.

Referring to step 102, the precursor solution is sprayed, via the ultrasonic nozzle, to form droplets of precursor solution. In certain embodiments, the precursor solution is sprayed at a flow rate of about 0.1 mL/min to about 10 mL/min, preferably about 0.5 mL/min to about 2 mL/min.

The droplets may have a wide range of diameters, such as about 10 to about 100 microns. In some embodiments, the ultrasonic nozzle is configured to produce droplets having diameters of about 20 to about 80 microns or about 30 to about 50 microns. The precursor solution, and therefore the droplets, may be sprayed downwardly into a furnace. In certain embodiments, this may obviate the need for a carrier gas. However, in certain embodiments, a carrier gas may be concurrently introduced to entrain the droplets and direct the droplets into the furnace. In certain embodiments, the carrier gas is introduced at a flow rate of about 1 to about 10 standard liters per minute (SLPM), preferably about 4 to about 8 SLMP.

Referring to step 103, the droplets of the precursor solution are heated via the furnace to form the microspheres. In certain embodiments, the heating evaporates the solvent in the precursor solution and cures the curable polymer, thereby forming the solidified microspheres. The furnace may be an electrical tube furnace with a vertical channel having a top opening that receives the droplets from the ultrasonic nozzle and a bottom opening that allows the solidified microspheres to exit the channel and enter a collection vessel.

Referring to step 104, the solidified microspheres are collected via the collection vessel. The microspheres may comprise a core and a shell and have diameters of up to about 100 microns. In some embodiments, the microspheres have diameters of about 20 to about 80 microns or about 30 to about 50 microns. The shell may comprise a cured polymer, such as silicone (e.g., Sylgard 184), and the core may comprise an additional polymer, such as polyethylene glycol (PEG).

The method 100 may include additional, less, or alternate steps and/or device(s), including those discussed elsewhere herein. For example, the microspheres may be separated from the solvent using a centrifuge.

EXAMPLES

The following example sets forth methods in accordance with the invention. It is to be understood, however, that this example is provided by way of illustration and nothing therein should be taken as a limitation upon the overall scope of the invention.

In these examples, ultrasonic spray pyrolysis was used to create both core-shell and solid microspheres. Generally, a nebulized precursor droplet is propelled through a heated tube where the solvent evaporates and the polymers in the precursor droplet phase separate to form a core and shell. The precursor solution contains a silicone oligomer and crosslinker that cure to form the shell encapsulating the core material, typically another polymer.

Example 1

The process used in this first example was adapted from the ultrasonication process described in U.S. Pat. No. 9,914, 106, which is incorporated by reference herein in its entirety. A precursor solution of the polymers selected to form the microspheres in a solvent is nebulized with a piezoelectric transducer. For initial work a 2.4 MHz transducer was used (Sonaer 241PGT). The nebulizer creates micron-sized droplets that are carried through a furnace tube using a nitrogen carrier gas supplied by the fume hood and plant nitrogen. A typical nitrogen flowrate of 0.6 L/min was used for the initial process. The droplets entrained in the carrier gas pass through a furnace (Carbolite Garo EVA12300B with 300 mm heated length) heated to 300° C. Due to the air gap between the glass furnace tube and the furnace side wall a set point on the furnace of 350° C. was determined to be needed to achieve a temperature of 300° C. in the tube itself (Clear Fused Quartz Furnace Tube, 32 mm ID×35 mm OD×550 mm Overall Length, 45/50 Outer Joint on Each End). In the furnace, the solvent evaporates while the core material and shell material phase separate. The shell material used was Sylgard 184 with a 2:1 base to catalyst ratio. The Sylgard 184 (PDMS) then cures on the outside of the polymer droplet encapsulating the core material which was polyethylene glycol with a molecular weight of 1000 (PEG 1000). The microspheres continue to pass through the furnace with the carrier gas and are collected in a series of 3-4 bubblers (Chemglass CG-4515) containing hexanes. Hexanes were chosen for product collection because both PEG and cured PDMS are insoluble in hexanes.

For the core-shell microspheres Sylgard 184 PDMS was used as the shell with PEG 1000 forming the core. It was decided to keep the PEG core inside the PDMS shell during collection and washing procedures. The PEG was chosen because it can be washed or baked out of the microspheres after incorporation into a matrix (i.e. DIW printing). This allows the spheres to maintain their shape during extrusion but create voids in the matrix of well-defined size and shape.

The base formulation used for the core-shell microspheres was 1.88% v/v of Sylgard 184 Base, 0.94% v/v of Sylgard 184 Accelerator, and 0.564% v/v of PEG 1000 in toluene. The overall concentration of polymer in solvent was varied in several experiments, but the ratio of the 3 polymer components was held constant.

The first experiment was performed using heat tape wrapped around the furnace tube as a heat source. The temperature of the heat tape was controlled with a temperature controller (Oakton TC5000) and a K-type thermocouple placed between the heat tape and the glass tube outer wall. The tube broke after the process had been running for 30 minutes because a metal adaptor was used at the top of the glass furnace tube. With no space between the heat tape and the metal adaptor, the metal became hot and expanded, cracking the glass. The concentration of the precursor solution was the standard formulation listed above. The particle size was evaluated by Malvern particle size analyzer to have a D50 of 10 μm. SEM images showed spheres in the 5-20 μm range, matching the particle size analyzer data.

After the initial trial, all subsequent work was done with the Carbolite Garo tube furnace. Particle size analysis (using a Malvern Mastersizer) of microspheres made with different concentrations of precursor solution show that the size of the microspheres can be tuned by changing concentration. Additionally, the distribution changed from bimodal (as seen in the lower concentrations) to trimodal for the 2× concentration microspheres. The highest concentration used was 2× the base concentration because higher concentrations could not be nebulized by the particle generators being used. The viscosity of the precursor solution was the limiting factor in how concentrated the solution could be made. The particle size also decreased when changing between the heat tape and furnace as the heating method. The cause of this change is unknown.

TABLE 1

| Impact of precursor concentration on particle size. | | | | |
| --- | --- | --- | --- | --- |
| Precursor Concentration | D10 (um) | D50 (um) | D90 (um) | Heating Method |
| 1X (Base Concentration) | 2.02 | 10.2 | 21.6 | Heat Tape |
| 1X (Base Concentration) | 1.08 | 3.27 | 11.9 | Furnace |
| 1.25X Concentration | 1.64 | 6.39 | 17.6 | Furnace |
| 2X Concentration | 1.49 | 10.2 | 52.9 | Furnace |

To demonstrate that the microspheres had a PDMS shell and PEG core both SEM and TGA were performed. The cores of the PDMS/PEG core-shell microspheres were removed by sonication in an acetone bath. The PEG 1000 began decomposing at around 200° C. There was a second weight loss region beginning around 400° C. associated with the decomposition of the PDMS. The microspheres with cores removed contained only PDMS, which is confirmed by the weight loss matching that of the cured Sylgard 184 by itself.

Figure 6:
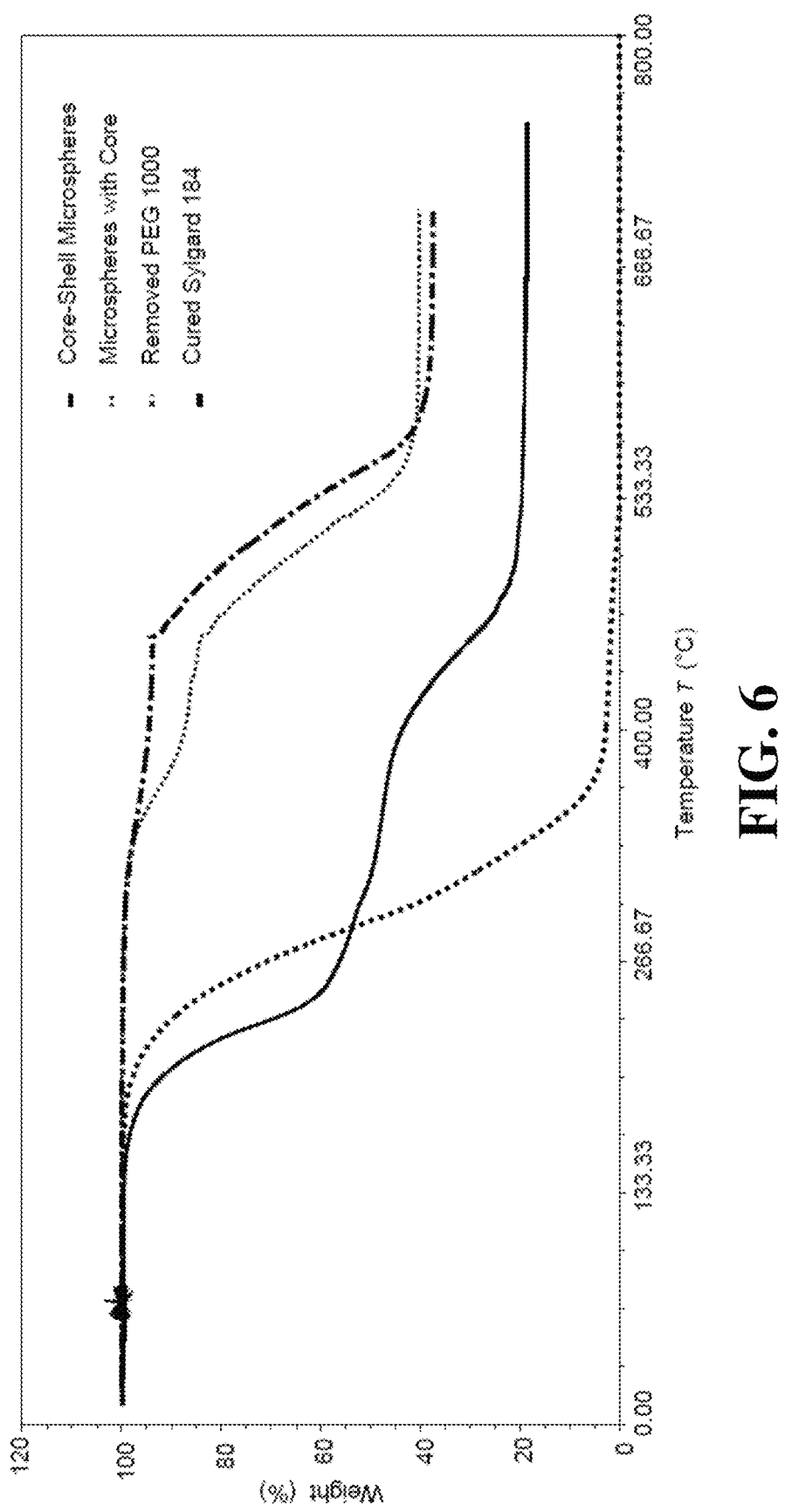
FIG. 6 is a graph showing the thermogravimetric analysis (TGA) of core-shell microspheres before and after core removal and starting materials.

The TGA confirms (see FIG. 6) that the microspheres are composed of both PDMS and PEG 1000, but SEM imaging was used to determine if the PDMS was forming the shell or the core of the microsphere or if the 2 materials were equally distributed throughout the particle. The SEM image showed that the spheres collapses when the PEG was removed via leaching with acetone. The Sylgard 184 material used is not rigid enough to maintain a spherical shape when the PEG core is removed. This also confirms that the PEG is the core material in the microspheres as expected.

While PEG with a molecular weight of 1000 was used for most of this work, two other molecular weights of PEG were also investigated, PEG 400 and PEG 6000. For the purposes of this work, the primary differences between these three molecular weights of PEG were the decomposition temperature and melting point. Microspheres were synthesized using both PEG 400 and PEG 6000, but PEG 1000 was selected for continuing work because it is a solid at room temperature and has the lowest onset of decomposition temperature.

TABLE 2

| Melting point and onset of decomposition of various molecular weights of PEG | | |
| --- | --- | --- |
| Average Molecular Weight (Mn) | Melting Point (° C.) | Onset of Decomposition (° C.) (by TGA) |
| 400 | 4-8 | 248 |
| 1000 | 33-40 | 244 |
| 6000 | 60-63 | 276 |

Proof of concept studies into making solid polymeric microspheres using the same method were also conducted. The polymers investigated were polyvinyl alcohol (PVA) and PEG. These polymers were selected for their solubility in water as potential materials that could be leached out of a matrix after incorporation. Keyence images of attempted PVA microspheres were inconclusive, but PEG 1000 microspheres were successfully synthesized using dichlorometh-ane (DCM) as the solvent, a furnace temperature of 50° C., and a precursor solution concentration of 3% v/v of PEG in DCM.

The process with the particle generators was limited in throughput by the rate of nebulization that the particle generators could handle as well as the tendency of the precursor solution to concentrate over time in the nebulizer reservoir. Since the solvent is more volatile than the polymers used, the concentration of the polymer in the reservoir became more concentrated and more viscous over time, eventually causing the nebulizer to stop creating droplets.

Example 2

To address the limitations of EXAMPLE 1, the instant example utilizes an ultrasonic nozzle instead of a piezoelectric transducer to generate the droplets of precursor solution. In the instant example, a precursor solution of solvent and polymer was continuously pumped through a commercially available ultrasonic nozzle (Sono-Tek 25 kHz nozzle with ECHO ultrasonic generator and ALIGN controller) where micron sized droplets were formed and sprayed through a tube furnace with or without a carrier gas.

Instead of the particle generators creating the droplets below the furnace and flowing the nitrogen upward through the furnace, the ultrasonic nozzle was mounted above the furnace allowing gravity to pull the droplets through the furnace. Initial trials were done without a carrier gas, but nitrogen carrier gas was used in the experiments described herein. Adding a nitrogen stream helped with throughput, but also decreased the particle size.

Nitrogen was added using a NW40 tee mounted on the top of the furnace tube. The nitrogen was connected to the top of the tee, and the nozzle was mounted on the horizontal portion of the tee. The tip of the nozzle reached approximately the middle of the vertical portion of the tee.

Microspheres were collected in a beaker or round bottom flask filled with hexanes rather than in a series of bubblers. The use of a round bottom flask allowed for in-situ particle size measurements to be made via a Mettler Toledo Particle Track FRBM instrument. To prevent microspheres to escape the 3rd arm was stoppered, the opening around the probe covered with parafilm, and a funnel used to connect the outlet of the furnace tube with the opening of the flask. A piece of filter paper was made into a cover for the funnel to prevent microspheres from escaping but allow the nitrogen through.

Two methods of measuring particle size were employed on the microspheres made with the ultrasonic nozzle. The first method was Keyence imaging of the microspheres with a custom MATLAB code to detect the circles on the images and determine the diameter of each. Several images from different parts of the sample were used with an attempt to analyze hundreds of spheres, but there are some inherent limitations in sampling of this nature. The second method used was Focused Beam Reflectance Measurement (FRBM) with a Mettler Toledo Particle Track instrument. FRBM uses a laser beam rotating around the probe window. When the beam hits a particle, it backscatters the light which is detected by the instrument. The resulting measurements are of chord length, but for spherical particles like the ones being measured the chord length can be used as a proxy for average particle diameter. The instrument measures thousands of particles per second, so the sample size is much larger and more representative than the Keyence imaging method.

The same ratio of polymers was used as prior work but at higher concentrations. The first trial was conducted with a 10× (or 33%) polymer solution, but the polymers were not fully soluble at this concentration, so subsequent work was done at lower concentrations.

Several studies were performed to determine how the precursor concentration, precursor flowrate, and use of nitrogen impacted the particle size of the resulting microspheres.

Decreasing the precursor solution concentration from 10×
(or 33%) to 5× (or 17%) decreased the average particle size
as determined by Keyence imaging and MATLAB code
from 79 μm to 44 μm. Without being bound by any theory,
it is believed the decrease in average particle size is because
the droplets formed by the nozzle are of constant size but
decreasing the polymer concentration by half results in
particles decreasing in size by half.

Nitrogen was added as a carrier gas for two reasons, to
decrease the particle size without further decreasing precur-
sor concentration and to increase throughput of material.
The target particle size for use in direct ink write printing is
nominally 10 to 20 μm, so particles of 40 to 80 μm would
be too large for some applications. A nitrogen flowrate of
6.65 slpm was used because it was the highest flowrate that
could be easily achieved with the nitrogen from the fume
hood. When adding 6.65 slpm of nitrogen with constant
precursor solution concentration of 5× (or 17%) and pre-
cursor flow rate of 1.0 mL/min, the average particle size as
determined by Keyence decreased to 10 μm. This is right at
the target particle size.

Figure 7:
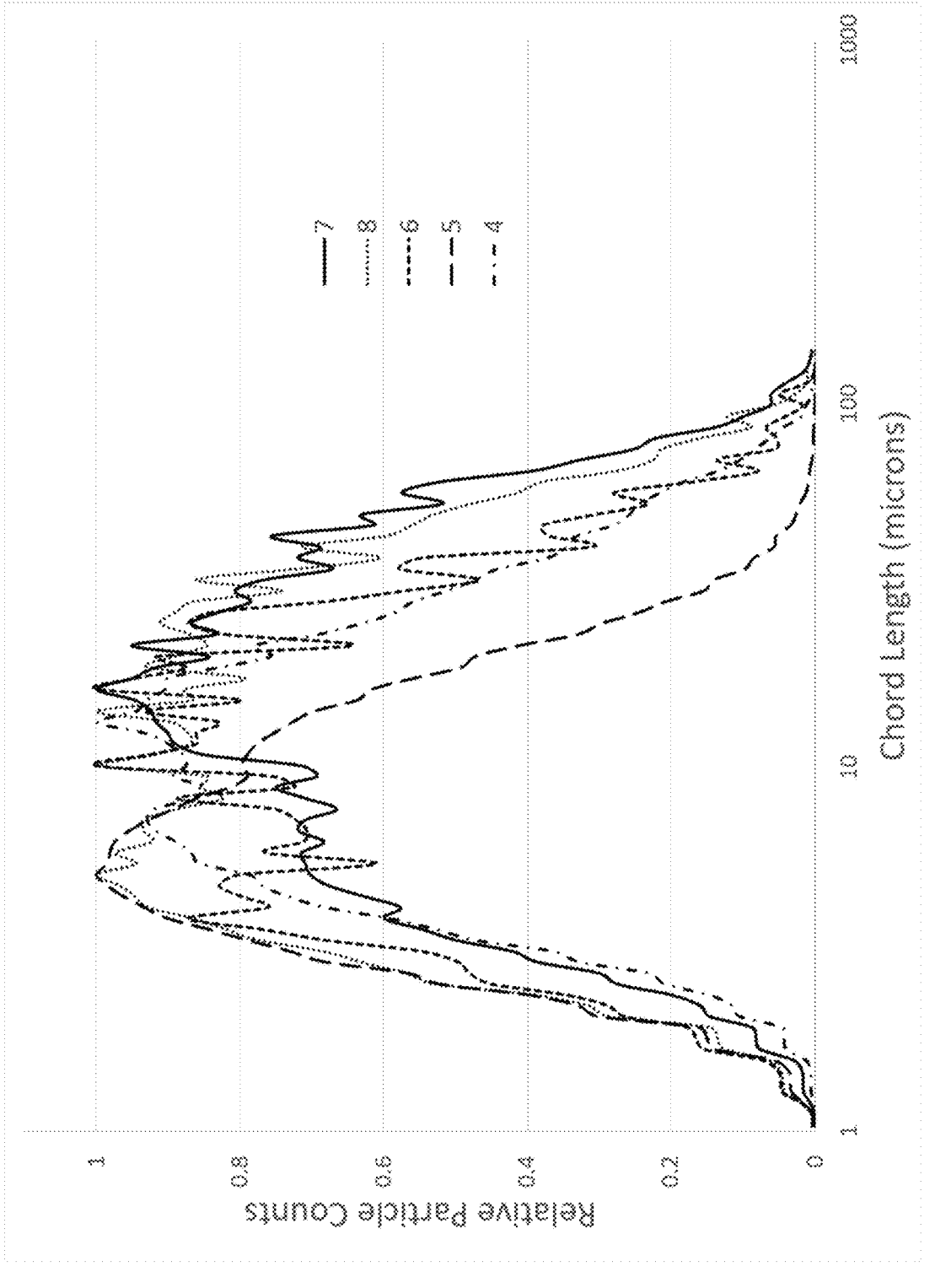
FIG. 7 is a graph showing the particle size distribution for microspheres analyzed via Particle Track.

The initial experiment compared different precursor flow
rates with constant precursor concentration and nitrogen
flowrate. The switch was also made from a glass furnace
tube to a metal furnace tube (NW40). This was also when the
Particle Track FRBM instrument was first used. A repeat of
the previous experiment with a precursor solution of 5X,
precursor flow rate of 1.0 mL/min, and a nitrogen flow rate
of 6.65 slpm showed that the results are repeatable with an
average particle size by both Keyence and FRBM of 16 μm
as compared to 10 μm from the previous experiment with the
same parameters. The precursor flow rate was then
decreased to 0.5 mL/min. The in-situ FRBM data showed a
decrease in average particle size, which is attributed to there
being fewer droplets making it less likely for droplets to
collide and combine. The Keyence measurements showed
an increase of average particle size to 21 μm, but it is
believed that because of the lower sampling rate of the
Keyence method that the FRBM results are more accurate.
See FIG. 7.

TABLE 3

Impact of precursor concentration, flowrate, and nitrogen on particle size

| Sample No. | Precursor Concentration (% v/v) | Precursor Flow Rate (mL/min) | Nitrogen Flow Rate (slpm) | Average Particle Size (um) (Keyence) | Average Particle Size (um) (FRBM) | Configuration Notes |
|---|---|---|---|---|---|---|
| 1 | 33% silicone/PEG | 1.0 | None | 79 | — | Glass Furnace Tube |
| 2 | 17% silicone/PEG | 1.0 | None | 44 | — | Glass Furnace Tube |
| 3 | 17% silicone/PEG | 1.0 | 6.65 | 10 | — | Glass Furnace Tube & NW40 Tee |
| 4 | 17% silicone/PEG | 1.0 | 6.65 | 16 | 16 | NW40 SS Tube & NW40 Tee |
| 5 | 17% silicone/PEG | 0.5 | 6.65 | 21 | 9 | NW40 SS Tube & NW40 Tee |
| 6 | 17% silicone/PEG | 1.0 | 6.65 | — | 16 | NW16 SS Tube with NW40 Tee |
| 7 | 17% silicone/PEG | 1.0 | 3 | — | 21 | NW40 SS Tube with Air Shaping Nozzle |
| 8 | 17% silicone/PEG | 1.0 | 10* | — | 17 | NW40 SS Tube with Air Shaping Nozzle |

*A leak was present in the system, so true flow rate of $N_2$ is not known

Most of the initial was focused on increasing the yield of the microspheres through the process. A large amount of polymer was found to be depositing on the sides of the furnace tube and never making it through the furnace to be collected. The glass furnace tube that had been used for many runs eventually was totally blocked by polymer curing in the top of the tube. Cleaning was subsequently implemented between runs to prevent clogging, but much material was still being lost in this manner.

Several possible methods to decrease the amount of polymer lost were identified and tried. One idea was to change the tube material or to coat the tubes with diamond like carbon (DLC). Stainless steel (304) tubes were purchased in multiple diameters. A coupon study was conducted to compare the amount of material adhering to glass, DLC coated glass, stainless steel, and DLC coated stainless steel. There was a 2.7-fold decrease in material deposited on stainless steel as compared to glass. A further 1.6-fold decrease in material deposited was seen on the DLC coated stainless steel as compared to uncoated stainless steel.

Another idea to improve yield was to use a smaller furnace tube to increase the velocity of the nitrogen stream while maintaining constant nitrogen flow rate. An NW16 tube (OD of 0.75" compared to 1.50" OD for NW40) was used for the furnace tube. The furnace tube did not have polymer buildup, but the NW40 tee and adaptors needed to hook the nozzle up to the smaller tube were still coated in similar levels of polymer. The average particle size was the same for the smaller tube, but the size distribution was wider than what was seen with the larger tube.

The final method to improve yield that was investigated was an air shaping nozzle purchased from Sono-tek. This nozzle has the same frequency as those previously used (25 kHz) but adds the ability to control the shape of the stream of droplets formed by the nozzle. This is done by flowing a gas (in this case nitrogen) around the droplets as an annulus to shape the droplets into a narrow stream. The initial experiment with this nozzle was limited in the nitrogen flow rate to 3 mL/min by the small ID tubing needed to feed the nitrogen into the nozzle. The average particle size by FRBM was 21 µm was similar to previous experiments, but the yield was increased to ~1 g/h of microspheres. The only buildup of polymer was on the reducing adaptor needed to mount the nozzle to the NW40 furnace tube.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

The patent claims at the end of this patent application are not intended to be construed under 35 U.S.C. § 112 (f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of forming microspheres, the method comprising:

pumping a precursor solution through an ultrasonic nozzle thereby forming a spray comprising droplets of the precursor solution, the ultrasonic nozzle being positioned above a furnace;

introducing the droplets of the precursor solution downwardly into the furnace via an opening positioned near a top of the furnace and below the ultrasonic nozzle; and heating the droplets of the precursor solution in the furnace to form the microspheres.

2. The method of claim 1, wherein the precursor solution comprises at least one curable polymer dissolved in a solvent.

3. The method of claim 2, wherein the heating the droplets evaporates the solvent and cures the at least one curable polymer, thereby forming the microspheres.

4. The method of claim 1, wherein the precursor solution further comprises an additional polymer.

5. The method of claim 4, wherein the curable polymer comprises a silicone material, wherein the additional polymer comprises polyethylene glycol, and wherein the solvent comprises a hydrocarbon solvent.

6. The method of claim 5, wherein the solvent is selected from the group consisting of toluene, xylene, ligroin, mineral spirits, and chlorinated hydrocarbons.

7. The method of claim 1, wherein the precursor solution has a total polymer concentration of greater than 100 mg/mL.

8. The method of claim 1, wherein the droplets are introduced into the channel without introducing a carrier gas into the channel.

9. The method of claim 1, further comprising concurrently introducing a carrier gas along with the droplets into the channel.

10. The method of claim 9, wherein the ultrasonic nozzle is installed within a conduit positioned above the furnace, the conduit comprising a side opening through which the ultrasonic nozzle is horizontally installed and a top opening positioned above the side opening, and wherein the carrier gas is introduced into the conduit downwardly through the top opening, and wherein the droplets and carrier gas are directed through an opening near the top of the furnace into the channel of the furnace.

11. The method of claim 1, wherein the microspheres have an average particle size (D50) of at least about 30 micrometers.

12. The method of claim 1, wherein the microspheres comprise are core-and-shell microspheres.

13. The method of claim 1, wherein the ultrasonic nozzle is aimed downward toward the furnace such that the ultrasonic nozzle sprays the droplets of the precursor solution downward into the furnace.

14. The method of claim 1, wherein the ultrasonic nozzle is aimed horizontally, the introducing step including spraying the droplets of the precursor solution into a downward flowing carrier gas.

15. The method of claim 1, further comprising a step of collecting the microspheres in a collection vessel positioned below the furnace.

16. The method of claim 15, wherein the collecting step includes receiving the microspheres in a solvent within the collection vessel, the method further comprising a step of separating the microspheres from the solvent via a centrifuge.

17. A method of forming microspheres, the method comprising:

pumping a precursor solution through an ultrasonic nozzle thereby forming a spray comprising droplets of the precursor solution;

introducing the droplets of the precursor solution downwardly into a channel of a furnace;

concurrently introducing a carrier gas along with the droplets of the precursor solution into the channel; and heating the droplets of the precursor solution in the furnace to form the microspheres, wherein the ultrasonic nozzle is installed within a conduit positioned above the furnace, the conduit comprising a side opening through which the ultrasonic nozzle is horizontally installed and a top opening positioned above the side opening, and wherein the carrier gas is introduced into the conduit downwardly through the top opening, and wherein the droplets and carrier gas are directed through an opening near a top of the furnace into the channel of the furnace.

18. The method of claim 17, further comprising a step of collecting the microspheres in a collection vessel positioned below the furnace.

19. The method of claim 18, wherein the collecting step includes receiving the microspheres in a solvent within the collection vessel, the method further comprising a step of separating the microspheres from the solvent via a centrifuge.

20. A method of forming microspheres, the method comprising:

pumping a precursor solution through an ultrasonic nozzle thereby forming a spray comprising droplets of the precursor solution;

introducing the droplets of the precursor solution downwardly into a furnace;

heating the droplets of the precursor solution in the furnace to form the microspheres; and collecting the microspheres in a collection vessel positioned below the furnace.

21. The method of claim 20, wherein the collecting step includes receiving the microspheres in a solvent within the collection vessel, the method further comprising a step of separating the microspheres from the solvent via a centrifuge.

* * * * *